United States Patent
Yin et al.

(10) Patent No.: US 7,423,630 B2
(45) Date of Patent: Sep. 9, 2008

(54) SIGNAL INPUT APPARATUS

(75) Inventors: Chun-Hsiung Yin, Tainan (TW); Hsun-Li Huang, Hsinchu (TW)

(73) Assignee: Qisda Corporation, Taoyuan (TW)

( * ) Notice: Subject to any disclaimer, the term of this patent is extended or adjusted under 35 U.S.C. 154(b) by 656 days.

(21) Appl. No.: 11/043,586

(22) Filed: Jan. 26, 2005

(65) Prior Publication Data
US 2005/0168442 A1   Aug. 4, 2005

(30) Foreign Application Priority Data
Feb. 3, 2004   (TW) ............................... 93102443 A

(51) Int. Cl.
*G09G 5/08* (2006.01)
(52) U.S. Cl. ...................... 345/158; 345/163
(58) Field of Classification Search .......... 345/156–172
See application file for complete search history.

(56) References Cited

U.S. PATENT DOCUMENTS

| | | | | |
|---|---|---|---|---|
| 5,983,073 A * | 11/1999 | Ditzik | ...................... | 455/11.1 |
| 6,091,404 A * | 7/2000 | Hong et al. | ................. | 345/167 |
| 6,433,780 B1 | 8/2002 | Gordon et al. | ............. | 345/166 |
| 6,498,458 B1 * | 12/2002 | Chen | .......................... | 320/114 |
| 6,600,479 B1 * | 7/2003 | Smith et al. | ................. | 345/163 |
| 7,050,041 B1 * | 5/2006 | Smith et al. | ................. | 345/156 |
| 2002/0061739 A1 * | 5/2002 | Nakamura et al. | .......... | 455/343 |
| 2003/0179177 A1 * | 9/2003 | Wang | ......................... | 345/156 |
| 2004/0183502 A1 * | 9/2004 | Cheng | ........................ | 320/108 |
| 2006/0044270 A1 * | 3/2006 | Chen | .......................... | 345/163 |
| 2006/0119569 A1 * | 6/2006 | Tsai | ........................... | 345/156 |

* cited by examiner

*Primary Examiner*—Jimmy H Nguyen
(74) *Attorney, Agent, or Firm*—Thomas, Kayden, Horstemeyer & Risley

(57) ABSTRACT

A signal input apparatus includes a hand-held device and a receiving device. The hand-held device includes a sensor for outputting a signal, a first data port coupled to the sensor, and a wireless signal transmitter coupled to the sensor. The receiving device includes a second data port and a wireless signal receiver. When the receiving device and the hand-held device are separated, the hand-held device outputs the signal through the wireless signal transmitter, and the receiving device receives the signal through the wireless signal receiver. When the receiving device and the hand-held device are integrated, the first data port and the second data port are electrically connected, the hand-held device outputs the signal through the first data port and the receiving device receives the signal through the second data port.

13 Claims, 4 Drawing Sheets

SIGNAL INPUT APPARATUS

This application claims the benefit of Taiwan application Serial. No. 93102443, filed Feb. 3, 2004, the subject matter of which is incorporated herein by reference.

BACKGROUND OF THE INVENTION

1. Field of the Invention

The invention relates in general to a signal input apparatus, and more particularly to a signal input apparatus having alternative power supply while the battery is exhausted

2. Description of the Related Art

Computer mouse is a signal input apparatus of a computer, especially being a pointing device for controlling the displacement of the cursor on screen. Conventionally, computer mouse is classified as an optical mouse and a mechanical mouse. The mechanical mouse controls the displacement of the cursor according to the input signal produced in accordance with the relative position of the rolling ball. Compared to the mechanical mouse, the optical mouse detects the relative movement of the mouse by an optical sensor and the optical sensor includes a light emitting diode (LED), lens and sensing IC. The sensing IC is preferably an IC of Agilent Technologies Ltd, the model No. of which is ADNS-2610 (referring to the U.S. Pat. No. 6,433,780).

Moreover, it brings more convenience to users that the computer mouse communicates with computer by wireless technique. When a computer and a projector are common applications in business, a wireless computer mouse allows a speaker to control the computer and move simultaneously during presentation.

However, a wireless computer mouse is driven by power of a battery, and the wireless computer mouse cannot be driven when the power of the battery is exhausted. Also, a pointing stick or a laser pen is required for the speaker to guide listeners' sight during presentation, but it is not easy for the speaker to hold a wireless computer mouse and a laser pen in one hand.

SUMMARY OF THE INVENTION

It is therefore an object of the invention to provide a signal input apparatus with alternative power supply and functions of a laser pen.

The invention achieves the above-identified object by providing a signal input apparatus includes a hand-held device and a receiving device. The hand-held device includes a sensor for outputting a signal, a first data port coupled to the sensor, and a wireless signal transmitter coupled to the sensor. The receiving device includes a second data port and a wireless signal receiver. When the receiving device and the hand-held device are separated, the hand-held device outputs the signal through the wireless signal transmitter, and the receiving device receives the signal through the wireless signal receiver. When the receiving device and the hand-held device are integrated, the first data port and the second data port are electrically connected, the hand-held device outputs the signal through the first data port and the receiving device receives the signal through the second data port Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
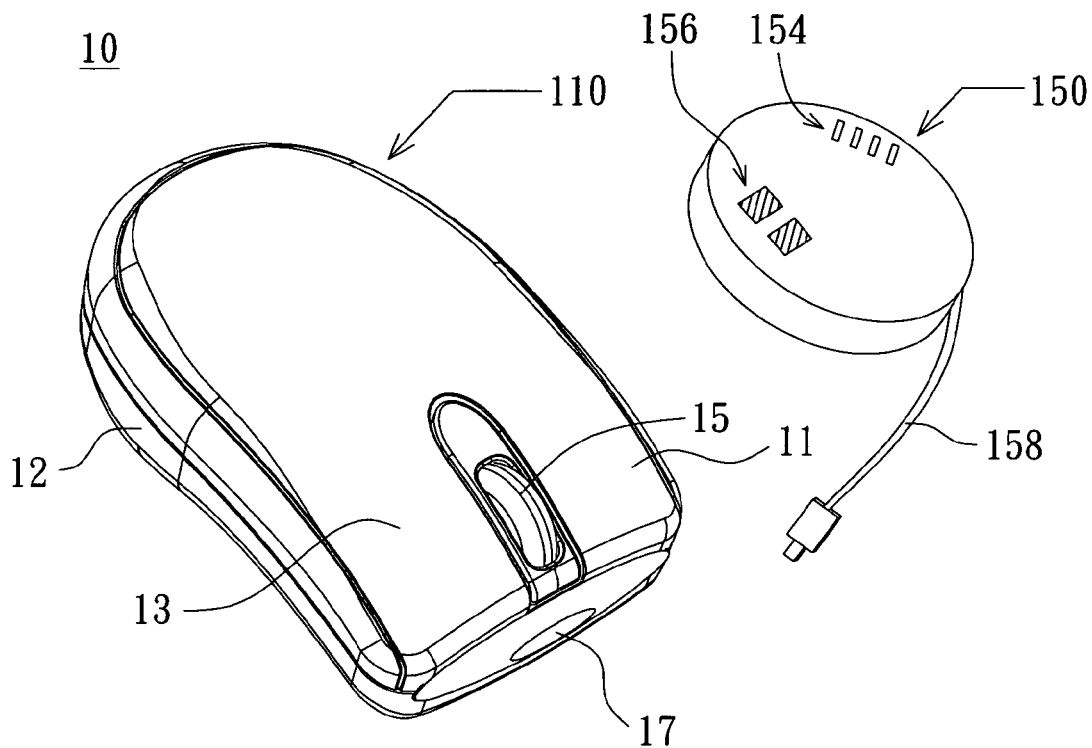
FIG. 1A is a sketch view of a signal input apparatus according to the preferred embodiment of the invention.

Referring to FIG. 1A, it is a sketch view of a signal input apparatus according to the preferred embodiment of the invention. The signal input apparatus 10 includes a hand-held device 110 and a receiving device 150. The hand-held device 110 is preferably a computer mouse. The computer mouse 110 outputs signals by wireless technique to provide users more ease and flexibility in use. The receiving device 150 is electrically connected to a computer through a power cable 158 and is for receiving the signals emitted from the computer 110 and transmitting the signals to the computer. The receiving device 150 is capable of being selectively integrated to the computer mouse 100. The receiving device 150 includes a contact port 156 for supplying electricity to the computer mouse 100 and a data port 154 for receiving the signals from the computer mouse 100 when the receiving device 150 is integrated with the computer mouse 100.

The computer mouse 100 includes a main body 12, a left click button 11, a right click button 13, a roller 15 and a light source 17. The left click button 11, the right click button 13 and the roller 15 are for controlling the computer and the light source 17 emits light as a guiding point during a presentation.

The computer mouse 110 of the prevent embodiment takes an optical mouse as the example, and the sensor 116 is a light sensor however, the prevent embodiment is not limited thereto. For example, the sensor 116 can be a rolling ball of a traditional mechanical mouse for detecting the displacement of the computer mouse.

Figure 1B:
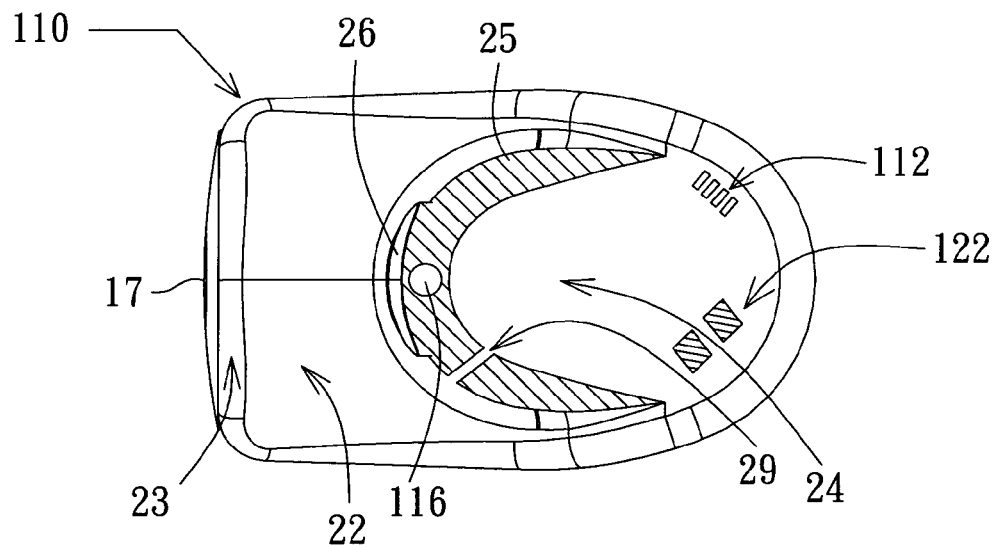
FIG. 1B is a sketch view showing the bottom side of the computer mouse in FIG. 1A.

Referring to FIG. 1B, it is a sketch view showing the bottom side of the computer mouse in FIG. 1A. The computer mouse 10 further includes an incline 22, two engaging surfaces 23, 25, a cavity 24, a start button 26, and a sensor 116. The two engaging surfaces 23 and 25 directly contact the surface of a desk when the computer mouse 110 is on the desk. The sensor 116 is on the engaging surface 25, and the start button 26 is for controlling the light source 17 to emit light when the start button 26 is pressed by user's finger.

The cavity 24 is for accommodating the receiving device 150 and includes a contact port 122 and a data port 112. The contact port 122 of the computer mouse 110 is electrically connected to the contact port 156 of the receiving device 150, and the data port 112 of the computer mouse 110 is electrically connected to the data port 154 of the receiving device 150, when the computer 110 is connected with the receiving device 150. The computer mouse 110 includes a slot 29 close to the cavity 24, so that the power cable 158 of the receiving device 150 is disposed within the slot 29 when the receiving device 150 and the computer mouse 110 are integrated.

Figure 1C:
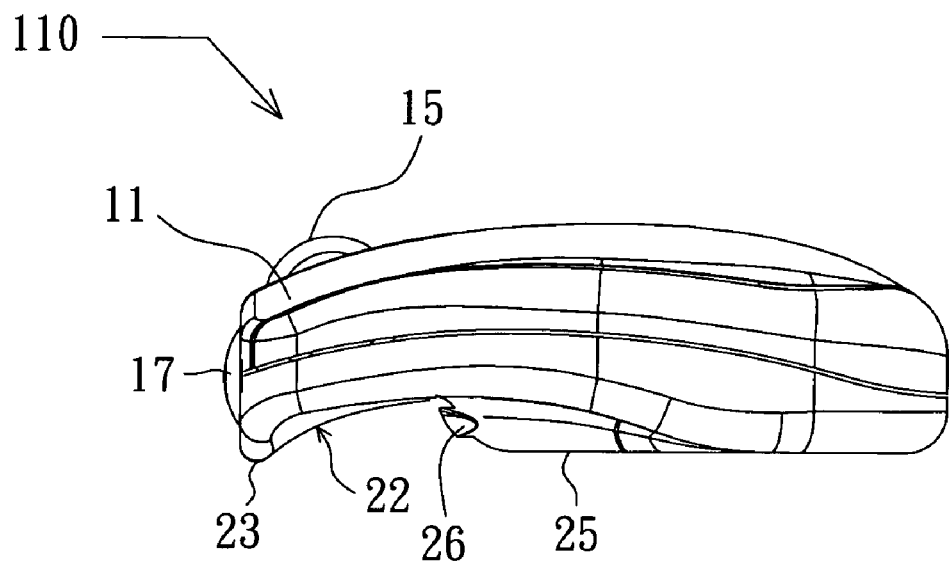
FIG. 1C is a sketch view showing the left side of the computer mouse in FIG. 1A.

Referring to FIG. 1C, it is a sketch view showing the left side of the computer mouse in FIG. 1A. When the computer mouse 110 is as a guilder during the presentation, the computer mouse 110 is hold within the hand and a user and the start button 26 can be selectively pressed or released by user's finger in order to control the light source 17 emitting light.

Figure 1D:
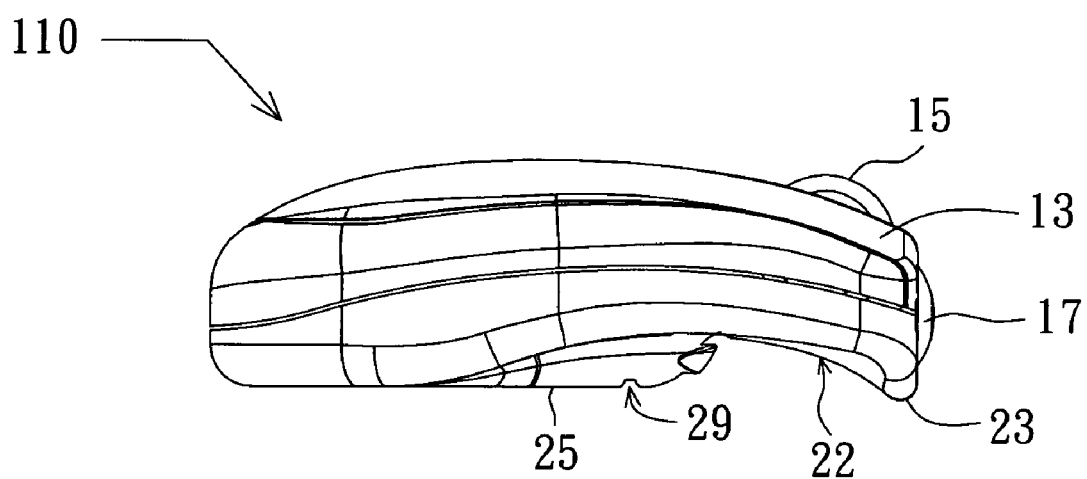
FIG. 1D is a sketch view showing the right side of the computer mouse in FIG. 1A.

Referring to FIG. 1D, it is a sketch view showing the right side of the computer mouse in FIG. 1A. It is vary clear to see from the lateral side that the receiving device 150 sunk within the computer mouse 110 when the receiving device 150 is accommodated within the computer mouse 110, so that the receiving device 150 won't obstruct the operation of the computer mouse 110.

Figure 1E:
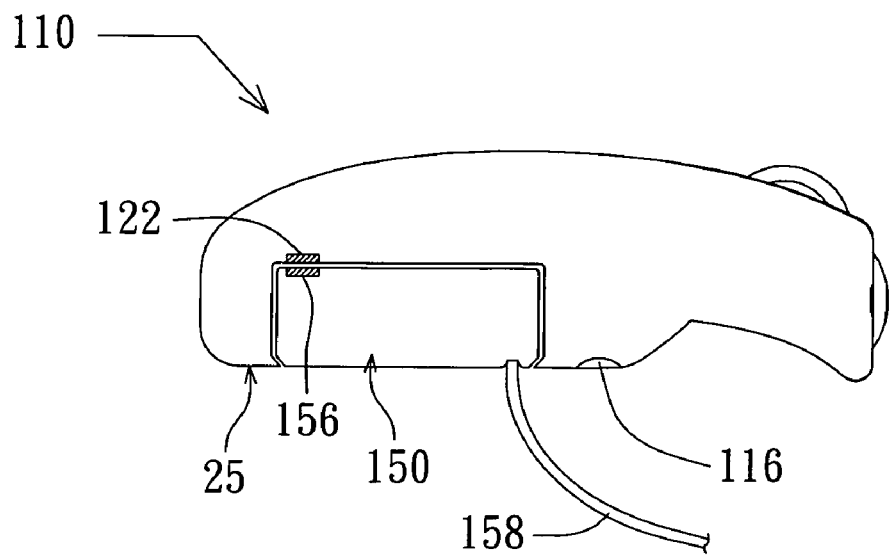
FIG. 1E is a lateral view showing the computer mouse and the receiving device are integrated in FIG. 1A.

Referring to FIG. 1E, it is a lateral view showing the computer mouse and the receiving device are integrated in FIG. 1A. In FIG. 1E, when the receiving device 150 is accommodated within the computer mouse 110, the contact port 122 of the computer mouse 110 is electrically connected to the contact port 156 of the receiving device 150, and the data port 112 of the computer mouse 110 is electrically connected to the data port 154 of the receiving device 150.

Figure 2:
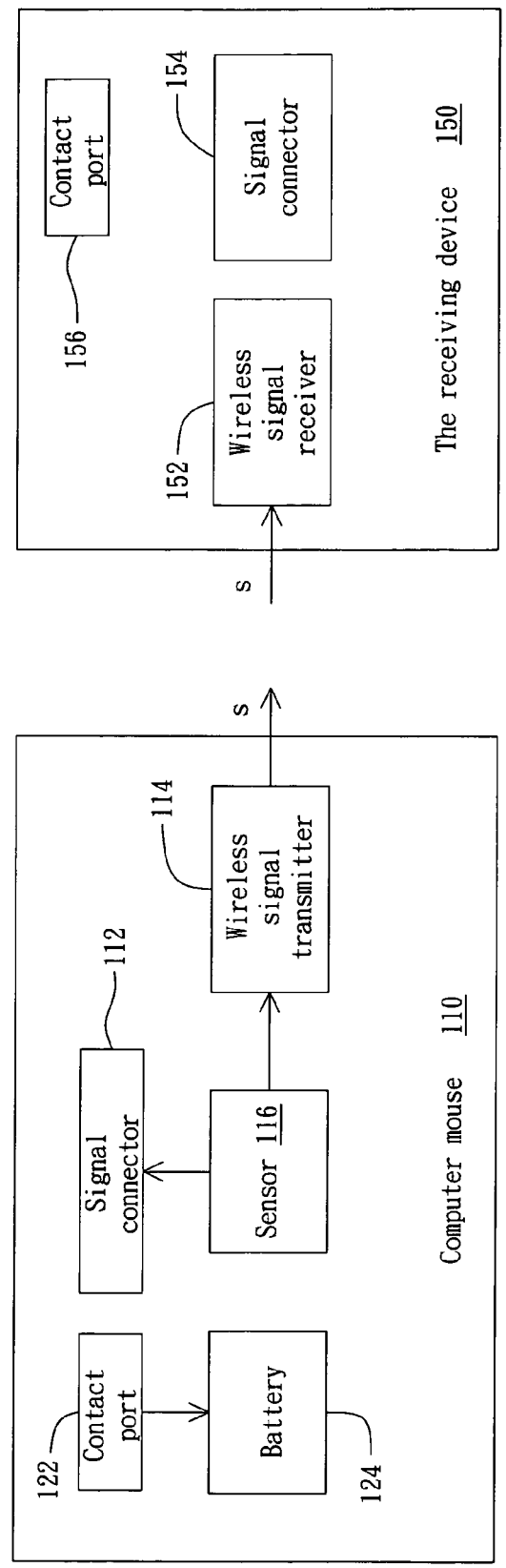
FIG. 2 is a block diagram of the signal input apparatus in FIG. 1A.

Referring to FIG. 2, it is a block diagram of the signal input apparatus in FIG. 1A. The signal input apparatus 10 includes a computer mouse 110 and a receiving device 150. The computer mouse 110 includes a sensor 116, a data port 112, a wireless signal transmitter 114, a contact port 122 and a battery 124. The data port 112 is electrically connected with the sensor 116. The sensor 116 detects the displacement of the computer mouse 110 relative to the desk and outputs a corresponding signal. The wireless signal transmitter 114 is coupled to the sensor 116 and for outputs the signal by wireless technique.

The receiving device 150 includes a wireless signal receiver 152, a data port 154 and a contact port 156. The wireless signal receiver 152 is for receiving the signal outputted from the computer mouse 110 and transmitted to the computer through the power cable 158.

When the receiving device 150 and the computer mouse 110 are separated, the computer mouse 110 transmits the signals to the receiving device 150 by wireless technique and the battery 124 inside the computer mouse 110 supplies power to the computer mouse 110.

When the receiving device 150 and the computer mouse 110 are integrated, the contact port 122 and the data port 112 of the computer mouse 110 are electrically connected to the contact port 156 and the data port 154 of the receiving device 150, respectively. The receiving device 150 supplies power to the computer mouse 110 through the contact ports 122 and 156. Also, the battery 124 can be charged by the receiving device 150 through the contact ports 112 and 156. Therefore, the receiving device 150 is accommodated within the cavity 24 of the computer mouse 110 to supply power to the computer mouse 110 and charge the battery 124. When the power of the battery 124 is exhausted, the computer mouse 110 is still capable of being used as a mouse with a cable line. The receiving device 150 can get power by electrically connecting with an external power supply through the power cable 158, and the external power supply is preferably a USB port of a computer.

When the receiving device 150 and the computer mouse 110 are integrated, the data port 112 is electrically connected to the data port 154, and the signal outputted from the sensor 116 is transmitted to the receiving device 150 through the data ports 112 and 154. Meanwhile, the wireless signal transmitter 114 of the computer mouse 110 and the wireless signal receiver 152 of the receiving device 150 are off, so that the consumption of power is decreased.

Further, the power cable 158 is accommodated in the receiving device 150 as an impacted coil, and when the computer mouse 110 is integrated to the receiving device 150, the power cable 158 can be pulled out to increase the operation ease of the computer mouse 110.

Figure 3:
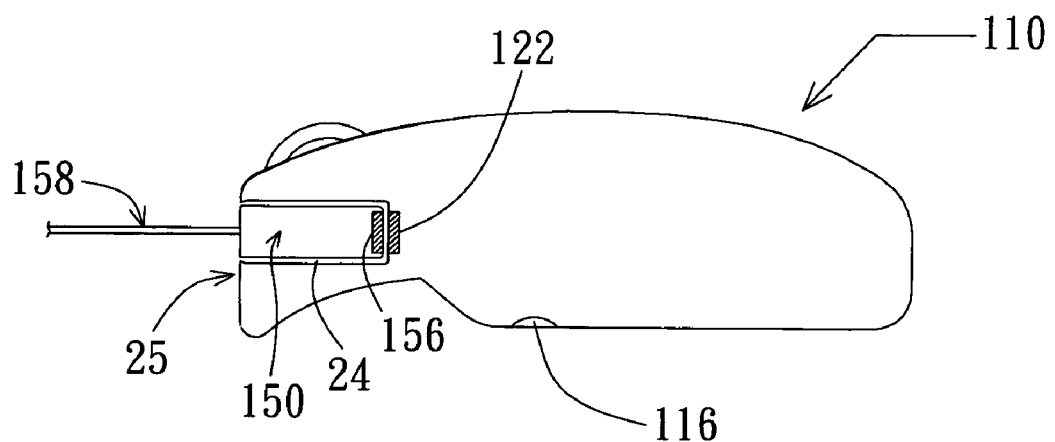
FIG. 3 is a sketch view of another signal input apparatus according to the preferred embodiment of the invention.

Referring to FIG. 3, it is a sketch view of another signal input apparatus according to the preferred embodiment of the invention. The engaging surface 25 is on one part of the computer mouse 110 and the receiving device 150 is disposed within the computer mouse 110 from the part. The contact port 156 and the data port 154 are disposed on the side of the receiving device 150. The contact port 122 and the data port 112 of the computer mouse 110 are on the surface of the cavity 24, so that the contact port 122 is electrically connected to the contact port 156, and the data port 112 is electrically connected to the data port 154, when the receiving device 150 and the computer mouse 110 are integrated.

To sum up, the signal input apparatus disclosed in the preferred embodiment of the present invention still operates through a receiving device when the battery inside of the computer mouse is exhausted, and the signal input apparatus provides a function of guiding light during presentation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A signal input apparatus, comprising:
   a hand-held device, having:
      a sensor for outputting a signal;
      a first data port coupled to the sensor; and
      a wireless signal transmitter coupled to the sensor; and
   a receiving device, capable of being selectively integrated with the hand-held device and having a second data port and a wireless signal receiver;
   wherein when the receiving device and the hand-held device are separated, the hand-held device outputs said signal through the wireless signal transmitter, and the receiving device receives said signal through the wireless signal receiver;
   wherein when the receiving device and the hand-held device are integrated, the first data port and the second data port are electrically connected, the hand-held device outputs said signal through the first data port and the receiving device receives said signal through the second data port, the combination of the receiving device and the hand-held device is dimensioned to be held within a user's hand.

2. The signal input apparatus according to claim 1, wherein the hand-held device further includes a battery and a first contact port, the receiving device further includes a second contact port, and the first contact port is electrically connected to the second contact port when the receiving device and the hand-held device are integrated, so that the battery is charged by the receiving device through the first contact port and the second contact port.

3. The signal input apparatus according to claim 2, wherein the battery supplies power to the hand-held device, when the receiving device and the hand-held device are separated.

4. The signal input apparatus according to claim 2, wherein the receiving device supplies power to the hand-held device through the first contact port and the second contact port, when the receiving device and the hand-held device are integrated.

5. The signal input apparatus according to claim 1, wherein, the wireless signal transmitter is off, when the receiving device and the hand-held device are integrated.

6. The signal input apparatus according to claim 1, wherein the receiving device further includes a power cable which connects the receiving device to an external power supply.

7. The signal input apparatus according to claim 6, wherein the power cable is accommodated in the receiving device as an impacted coil.

8. The signal input apparatus according to claim 1, wherein the hand-held device further includes an engaging surface and a cavity formed on the engaging surface, and the receiving device is accommodated within the cavity when the receiving device and the hand-held device are integrated.

9. The signal input apparatus according to claim 8, wherein the receiving device further includes a power cable, and the hand-held device includes a slot formed on the engaging surface, so that the power cable is disposed within the slot when the receiving device and the hand-held device are integrated.

10. The signal input apparatus according to claim 8, wherein the sensor is disposed on the engaging surface and the engaging surface is smooth and stays close to an even plane when the receiving device and the hand-held device are integrated.

11. A signal input apparatus, comprising:
a hand-held device, having:
an engaging surface and a cavity formed thereon;
a sensor for outputting a signal; and
a wireless signal transmitter coupled to the sensor and outputting said signal; and
a receiving device having a wireless signal receiver and capable of being selectively received within the cavity;
wherein when the receiving device is received within the cavity, the receiving device is electrically connected to the sensor for receiving said signal.

12. The signal input apparatus according to claim 11, wherein the sensor is disposed on the engaging surface and the receiving device is accommodated within the cavity, so that the engaging surface of the hand-held device stays close to an even plane.

13. The signal input apparatus according to claim 11, wherein the receiving device further includes a power cable, and the hand-held device includes a slot formed on the engaging surface, so that the power cable is disposed within the slot when the receiving device and the hand-held device are integrated.

* * * * *